US010608445B2

(12) United States Patent
Kaneko

(10) Patent No.: US 10,608,445 B2
(45) Date of Patent: Mar. 31, 2020

(54) POWER SUPPLY SYSTEM

(71) Applicant: Envision AESC Japan Ltd., Kanagawa (JP)

(72) Inventor: Kazumi Kaneko, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 0 days.

(21) Appl. No.: 16/095,083

(22) PCT Filed: Sep. 19, 2017

(86) PCT No.: PCT/JP2017/033731
§ 371 (c)(1),
(2) Date: Oct. 19, 2018

(87) PCT Pub. No.: WO2018/056262
PCT Pub. Date: Mar. 29, 2018

(65) Prior Publication Data
US 2019/0123568 A1    Apr. 25, 2019

(30) Foreign Application Priority Data

Sep. 21, 2016 (JP) ................... 2016-184628
Apr. 27, 2017 (JP) ................... 2017-088110

(51) Int. Cl.
*H02J 7/00*   (2006.01)
*H01M 10/48*  (2006.01)
(Continued)

(52) U.S. Cl.
CPC .......... *H02J 7/0021* (2013.01); *H01M 2/202* (2013.01); *H01M 10/48* (2013.01);
(Continued)

(58) Field of Classification Search
CPC . H02J 7/0021; H02J 7/00; B60L 58/21; B60L 58/13; H01M 10/48; Y02T 10/7005
(Continued)

(56) References Cited

U.S. PATENT DOCUMENTS 7,579,842 B2 *   8/2009   Hunter ................. H02J 7/0019
                                                              320/103
8,647,765 B2     2/2014   Ishishita et al.
(Continued)

FOREIGN PATENT DOCUMENTS

JP       2012-205401 A     10/2012
JP    WO2012/147121 A1     11/2012
(Continued)

*Primary Examiner* — Suresh Memula
(74) *Attorney, Agent, or Firm* — Morgan, Lewis & Bockius LLP

(57) ABSTRACT

A power supply system that can suppress battery performance degradation due to deposition is provided. Among two battery packs (101, 102) for which it is determined whether a parallel connection is to be made, a specific battery characteristic regarding a charging battery pack (102) that is a battery pack having the lower voltage is calculated. Then, it is determined whether the battery characteristic matches an allowance condition, and it is determined whether the two battery packs (101, 102) are to be connected in parallel to each other. In addition, at least one of the battery characteristic and the allowance condition changes in accordance with a voltage of the charging battery pack (102).

4 Claims, 5 Drawing Sheets

(51) Int. Cl.
*H01M 2/20* (2006.01)
*H02J 7/14* (2006.01)
*B60K 6/28* (2007.10)
*B60L 53/00* (2019.01)
*B60L 58/12* (2019.01)
*B60L 50/50* (2019.01)

(52) U.S. Cl.
CPC ......... *H01M 10/482* (2013.01); *H02J 7/0013* (2013.01); *H02J 7/0024* (2013.01); *H02J 7/14* (2013.01); *H02J 7/1423* (2013.01); *H02J 7/1461* (2013.01); *B60K 6/28* (2013.01); *B60L 50/50* (2019.02); *B60L 53/00* (2019.02); *B60L 58/12* (2019.02); *B60Y 2200/91* (2013.01); *B60Y 2200/92* (2013.01); *Y02T 10/7005* (2013.01)

(58) Field of Classification Search
USPC .......................................................... 320/116
See application file for complete search history.

(56) References Cited

U.S. PATENT DOCUMENTS

| | | | |
|---|---|---|---|
| 8,704,405 | B2 | 4/2014 | Deng et al. |
| 8,902,072 | B2* | 12/2014 | Lee ........................ G01R 31/28 340/636.1 |
| 9,018,956 | B2* | 4/2015 | Eguchi .................. H02J 7/0016 324/434 |
| 9,627,718 | B2 | 4/2017 | Inaba et al. |
| 2006/0001403 | A1* | 1/2006 | Yudahira .......... G01R 19/16542 320/134 |
| 2008/0156551 | A1* | 7/2008 | Kawahara ............... B60L 58/22 701/22 |
| 2010/0052615 | A1* | 3/2010 | Loncarevic .......... H02J 7/0016 320/118 |
| 2011/0115416 | A1* | 5/2011 | Oh ......................... H02J 7/345 318/139 |
| 2013/0141047 | A1* | 6/2013 | Huang .................. H02J 7/0018 320/116 |

FOREIGN PATENT DOCUMENTS

| | | |
|---|---|---|
| JP | 2013-524748 A | 6/2013 |
| JP | WO2014/128941 A1 | 8/2014 |
| WO | 2010/067735 A1 | 6/2010 |

* cited by examiner

POWER SUPPLY SYSTEM

TECHNICAL FIELD

The present invention relates to a power supply system.

BACKGROUND ART

In a power supply system including a plurality of battery packs, for example, at the start time of the power supply system, by turning on a relay that is connected to a battery string included in each of the battery packs, the plurality of battery packs may be connected in parallel to each other. At this time, if there is a difference between the voltages of the battery packs, when the relay is turned on, a circulating current flows in the battery packs. The circulating current exceeding an allowable value that is determined in accordance with the battery packs may result in breakdown of the battery packs.

For this situation, PTL 1 discloses a battery module that reduces breakdown of the battery packs by connecting the battery packs in parallel to each other only when the voltage difference between the battery packs is less than or equal to a fixed value.

CITATION LIST

Patent Literature

PTL 1: Japanese Unexamined Patent Application Publication (Translation of POT Application) No. 2013-524748

SUMMARY OF INVENTION

Technical Problem in a case where a lithium ion battery or the like is used in battery packs, a circulating current may cause lithium (Li) or the like to be deposited on an electrode of a battery, which may degrade the performance of the battery. Such deposition typically occurs in a charging battery pack having a low voltage among the battery packs that are connected in parallel to each other, and is more likely to occur as the voltage of the charging battery pack is higher.

In the technique disclosed in PTL 1, although the voltage difference between the battery packs is considered, there is no description about the occurrence of deposition, and the voltage of a battery pack regarding the occurrence of deposition is not considered either. Thus, it is not possible to suppress battery performance degradation due to deposition.

The present invention has been made in view of the above issue and is directed to providing a power supply system that can suppress battery performance degradation due to deposition.

Solution to Problem

A power supply system according to an aspect of the present invention is a power supply system including a plurality of battery packs and includes: calculation means for calculating a specific battery characteristic regarding a charging battery pack that is a battery pack having a lowest voltage among at least two battery packs out of the battery packs for which it is determined whether a parallel connection is to be made; and determination means for determining whether the at least two battery packs are to be connected in parallel by comparing the battery characteristic and an allowable value with each other. One of the battery characteristic and the allowable value changes in accordance with a voltage of the charging battery pack.

Advantageous Effects of Invention

It becomes possible to suppress battery performance degradation due to deposition.

DESCRIPTION OF EMBODIMENTS

Figure 1:
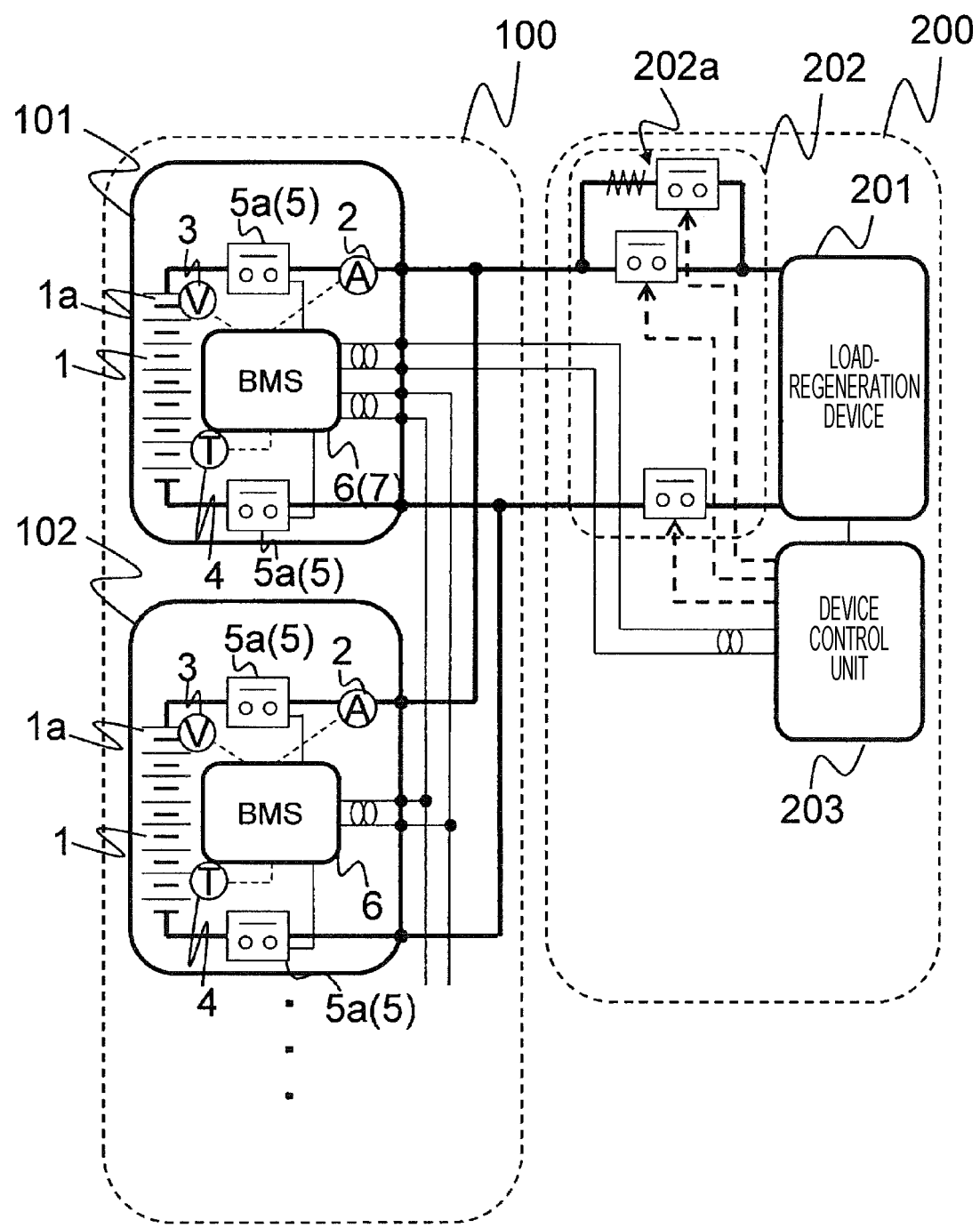
FIG. 1 is a diagram illustrating a configuration of a power supply system according to a first embodiment of the present invention.

Hereinafter, embodiments of the present invention will be described with reference to the drawings. Note that parts having the same functions are denoted by the same reference numerals in the drawings, and a description thereof may be omitted.

First Embodiment

FIG. 1 is a diagram illustrating a configuration of a power supply system according to a first embodiment. A power supply system 100 illustrated in FIG. 1 is connected to an electric device 200 and serves as a power source of the electric device 200. The electric device 200 is for example, but not limited to, a hybrid car, an electric vehicle, or the like. Note that the power supply system 100 may be mounted in the electric device 200.

The electric device 200 includes a load-regeneration device 201, a connection circuit 202, and a device control unit 203. The load-regeneration device 201 serves as a load of the power supply system. 100 and also serves as a regeneration device that supplies regenerated energy to the power supply system 100. The connection circuit 202 switches a connection state between the power supply system 100 and the load-regeneration device 201.

In the illustrated example, the connection circuit 202 includes a pre-charge circuit 202a that performs pre-charge at the time of connection between the power supply system 100 and the load-regeneration device 201. However, the pre-charge circuit 202a may be omitted. The device control unit 203 controls the connection circuit 202. For example, the device control unit 203 connects the power supply system 100 to the load-regeneration device 201 by using the connection circuit 202 at the start time of the electric device 200, for example. In addition, the device control unit 203 inputs to the power supply system 100 a control signal for controlling the power supply system 100.

The power supply system 100 includes a plurality of battery packs. Any of the battery packs serves as a master (Master) battery pack that controls the rest of the battery packs, and the rest of the battery packs serve as slave (Slave) battery packs that are controlled by the master battery pack. In FIG. 1, two battery packs 101 and 102 are illustrated from among the plurality of battery packs. The battery pack 101 is the master battery pack, and the battery pack 102 is a slave battery pack.

Figure 2:
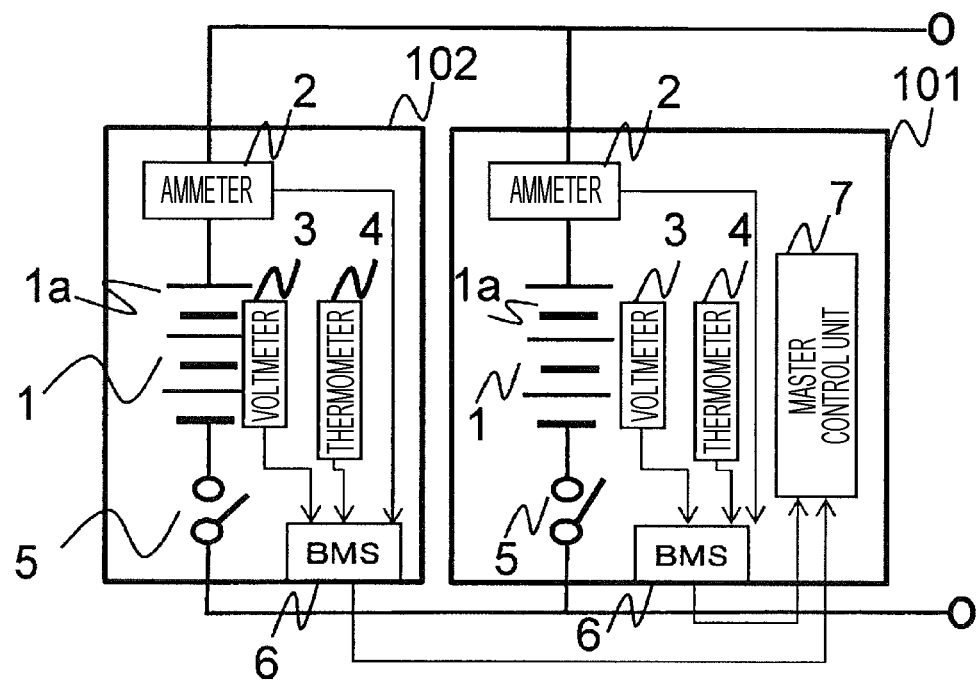
FIG. 2 is a diagram illustrating configurations of battery packs according to the first embodiment of the present invention.

FIG. 2 is a diagram illustrating configurations of the battery packs 101 and 102. Each of the battery packs 101 and 102 includes a battery unit 1, an ammeter 2, a voltmeter 3, a thermometer 4, a switch 5, and a BMS (Battery Management System: battery monitoring system) 6. In addition, the battery pack 101 serving as the master battery pack further includes a master control unit 7. Note that the master control unit 7 may be integrated with the BMS 6 of the battery pack 101 serving as the master battery pack as illustrated in FIG. 1.

The battery unit 1 is composed of a secondary battery that discharges power that is stored by charging. In this embodiment, the battery unit 1 is composed of a battery string, i.e., a plurality of battery cells 1a connected in series to each other. Although each of the battery packs 101 and 102 includes eight battery cells 1a in FIG. 1 and three battery cells 1a in FIG. 2, the number of the battery cells 1a is not limited to a particular number.

The number of the battery cells 1a may be equal in all of the battery packs. In this embodiment, the number of the battery cells 1a is equal in all of the battery packs, which is represented as n in the following description. In addition, the battery unit 1 is not limited to the example of the battery string in which the plurality of battery cells are connected in series. For example, as long as the plurality of unit batteries are connected in series, each of the unit batteries may be a single battery cell as in this embodiment, or a unit battery composed of a plurality of battery cells that are connected in parallel can be used.

The type of the battery cells 1a is not limited to a particular type, but is a lithium ion battery in this embodiment. In this case, when the battery packs 101 and 102 are connected in parallel to each other, a circulating current Generated in the battery packs 101 and 102 may result in deposition (specifically, lithium deposition) on a negative electrode of the charging battery pack, which is a battery pack having the lower voltage of the battery packs 101 and 102. A condition under which the deposition occurs, in other words, a condition for preventing the deposition differs depending on the voltage, current, and temperature of the charging battery pack. Hereinafter, the circulating current generated in the battery packs 101 and 102 when the battery packs 101 and 102 are connected in parallel to each other may also be simply called circulating current.

The ammeter 2 measures a pack current that is the current flowing in the battery unit 1 and outputs a current detection signal indicating the pack current to the BMS 6. The voltmeter 3 measures for each of the battery cells 1a a cell voltage that is the voltage of the battery cell 1a included in the battery unit 1 and outputs a voltage detection signal indicating the cell voltages to the BMS 6. The thermometer 4 measures for each of the battery cells 1a a cell temperature that is the temperature of the battery cell 1a included in the battery unit 1 and outputs a temperature detection signal indicating the cell temperatures to the BMS 6.

The switch 5 switches the connection between the battery unit 1 and the battery unit 1 of the other battery pack, and the connection between the battery unit 1 and the electric device 200. When the battery packs are connected in parallel, the switches 5 of the battery packs 101 and 102 are all turned on (conducted), and when the parallel connection of the battery packs is stopped, the switches are all turned off. Although the example in FIG. 2 conceptually illustrates the switch 5, the switch 5 is configured from, for example, two relays 5a and the like with the battery unit 1 interposed therebetween as illustrated in FIG. 1.

The BMS 6 receives the current detection signal, the voltage detection signal, and the temperature detection signal from the ammeter 2, the voltmeter 3, and the thermometer 4, respectively. On the basis of the cell voltages and the cell temperatures indicated by the voltage detection signal and the temperature detection signal, the BMS 6 obtains battery information regarding the battery pack including the BMS 6 and outputs the battery information to the master control unit 7 of the battery pack 101. Note that the current detection signal is not used in this embodiment.

The battery information is a pack voltage Vp that is the voltage of the battery unit 1 and an internal resistance R of the battery unit 1 in this embodiment. In addition, an allowable value is an allowable circulating power Pin that is an allowable value of a circulating power that is the power supplied to the charging battery pack by the circulating current. The internal resistance differs depending on a pack temperature T that is the temperature of the battery unit 1.

The allowable circulating power Pin is a maximum power by which deposition that occurs at a negative electrode of the charging battery pack by the circulating current can be prevented. As described later, when an assumed circulating power Pc that is an assumed power supplied to the charging battery pack by the circulating current is less than the allowable circulating power Pin, it is determined that the assumed circulating power Pc matches an allowance condition, and the battery packs 101 and 102 are connected in parallel to each other. Note that the prevention of deposition herein does not mean complete prevention of deposition, but means to suppress deposition at least in an allowable range.

The BMS 6 can calculate and determine the allowable circulating power Pin from a deposition prevention MAP that is map information indicating, for each temperature of the charging battery pack, a relationship between a maximum voltage and a maximum current (maximum voltage and maximum current by which deposition can be prevented in the charging battery pack) that are allowable in the charging battery pack. Note that in a case where the battery unit 1 is composed of the battery string including the plurality of battery cells 1a as in this embodiment, a battery cell in which deposition is most likely to occur is a battery cell having the maximum voltage in the battery string. Accordingly, the maximum voltage allowed in the charging battery pack is a maximum cell voltage Vmax that is the maximum cell voltage among the cell voltages of the battery cells.

Figure 3:
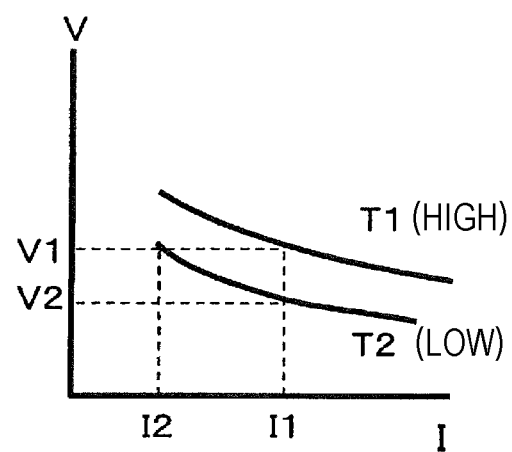
FIG. 3 is a diagram for illustrating an example of a deposition prevention MAP.

FIG. 3 is a diagram for illustrating the deposition prevention MAP and indicates the relationship between the maximum voltage and the maximum current that are allowed in the charging battery pack for each temperature. Specifically, FIG. 3 illustrates a graph indicating the relationship between the maximum voltage and the maximum current that are allowed in the charging battery pack when the temperature is T1 and T2. Note that the horizontal axis represents the current, the vertical axis represents the voltage, and the temperature T1 is higher than the temperature T2.

As illustrated in FIG. 3, as the current flowing in the charging battery pack is higher, the maximum voltage by which deposition can be prevented is lower, and as the voltage applied to the charging battery pack is higher, the maximum current by which deposition can be prevented is lower, in the relationship between the maximum voltage and the maximum current by which deposition can be prevented. In addition, as the temperature is higher, the maximum voltage and the maximum current by which deposition can be prevented are lower. The deposition prevention MAP indicates the relationship represented by a graph such as the graph illustrated in FIG. 3 for each temperature. The format of the deposition prevention MAP is not limited to a particular format, and the above relationship may be represented by a table or the like, or a formula (approximate expression) or the like.

Referring back to FIG. 2, upon reception of a connection instruction indicating a mutual connection between the battery packs from the master control unit 7, the BMS 6 turns on the switch to connect the battery unit 1 to the battery unit of the other battery pack, thereby connecting the battery packs 101 and 102 in parallel to each other.

The master control unit 7 receives the battery information from the BMS 6 of each of the battery packs 101 and 102, and on the basis of the battery information, the master control unit 7 determines whether the battery packs 101 and 102 are to be connected in parallel to each other.

Now, a specific process performed by the master control unit 7 will be described. Note that the pack voltage Vp, the internal resistance R, and the allowable circulating power Pin that are included in the battery information from the battery pack 101 may be respectively referred to as Vp1, R1, and Pin1, and the pack voltage Vp, the internal resistance R, and the allowable circulating power Pin that are included in the battery information from the battery pack 102 may be respectively referred to as Vp2, R2, and Pin2.

On the basis of the pack voltages Vp1 and Vp2, the master control unit 7 calculates a pack voltage difference ΔV (=|Vp1−Vp2|) that is a voltage difference between the battery packs 101 and 102. Then, on the basis of the pack voltage difference ΔV, the master control unit 7 calculates an assumed circulating current Ic (=ΔV/(R1+R2))) that is an assumed circulating current flowing in the battery packs 101 and 102 when the battery packs 101 and 102 are connected in parallel to each other. In addition, the master control unit 7 determines whether the assumed circulating current Ic is less than a threshold current Ith that is determined in advance. The threshold current Ith is the maximum current with which the battery packs 101 and 102 are not possibly damaged by the circulating current.

In addition, the master control unit 7 obtains a specific battery characteristic of the charging battery pack and determines whether the battery characteristic matches the allowance condition. One of the specific battery characteristic and the allowance condition changes in accordance with the voltage (specifically, the maximum cell voltage Vmax) of the charging battery pack.

In this embodiment, the specific battery characteristic is the assumed circulating power Pc that is an assumed power supplied to the charging battery pack by the circulating current generated in the battery packs 101 and 102 when the battery packs 101 and 102 are connected in parallel to each other. The following description will be given on the assumption that the charging battery pack is the battery pack 102. In this case, the assumed circulating power Pc is calculated as follows: Pc=Ic$^2$×R2. In addition, the allowance condition is that the assumed circulating power Pc is less than the allowable circulating power Pin2. Therefore, the master control unit 7 determines whether the assumed circulating power Pc is less than the allowable circulating power Pin.

In this embodiment, in a case where the assumed circulating current Ic is less than the threshold current Ith and where the assumed circulating power Pc is less than the allowable circulating power Pin, the master control unit 7 allows a mutual connection between the battery packs 101 and 102. In addition, in a case where the assumed circulating current Ic is greater than equal to the threshold current Ith or where the assumed circulating power Pc is greater than or equal to the allowable circulating power Pin, the master control unit 7 does not allow a mutual connection between the battery packs 101 and 102.

In a case where a mutual connection between the battery packs 101 and 102 is allowed, the master control unit 7 outputs a connection instruction to the BMS 6 of each of the battery packs 101 and 102.

Figure 4:
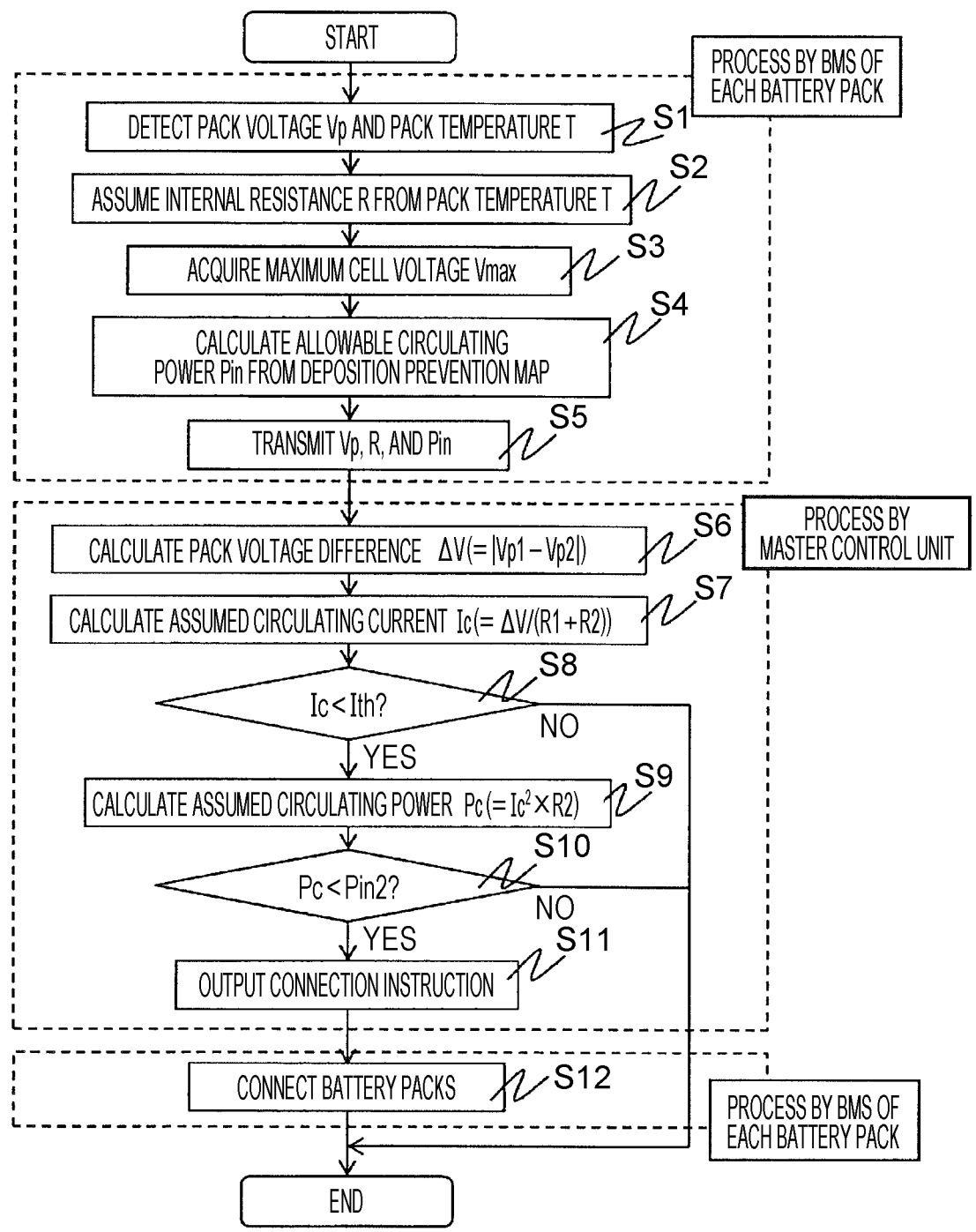
FIG. 4 is a flowchart for illustrating an operation of the power supply system according to the first embodiment of the present invention.

Next, an operation will be described. FIG. 4 is a flowchart for illustrating an operation of the power supply system. The following operation is executed during a starting process for starting the electric device 200. In addition, at an initial state before the starting process, the switch 5 is turned off.

In the starting process, the device control unit 203 of the electric device 200 outputs to the master control unit 7 a control signal that is an instruction for a mutual connection between the battery packs. Upon reception of the control signal, the master control unit 7 outputs an operation instruction to the BMS 6 of each of the battery packs 101 and 102. Upon reception of the operation instruction, the BMS 6 executes the following operation. Note that the process in the following steps S1 to S5 and S12 is executed by the BMS 6 of each of the battery packs 101 and 102, and the process in steps S6 to S11 is executed by the master control unit 7.

First, the BMS 6 receives the voltage detection signal and the temperature detection signal respectively from the voltmeter 3 and the thermometer 4, and on the basis of the cell voltages and the cell temperatures indicated by the voltage detection signal and the temperature detection signal, the BMS 6 detects the pack voltage Vp and the pack temperature T (step S1). At this time, the BMS 6 detects the total cell voltage as the pack voltage Vp and detects a representative cell temperature as the pack temperature T.

The representative value may be a static value such as the average, median, maximum, or minimum or the cell temperature of a specific battery cell 1a. The specific battery cell 1a is, for example, a battery cell 1a having a highest cell voltage. In addition, instead of measuring the cell temperature of the battery cell 1a, the thermometer 4 may measure the temperature at a specific position of a battery pack. In this case, the BMS 6 uses the temperature measured by the thermometer 4 directly as the pack temperature T.

Subsequently, on the basis of the pack temperature T, the BMS 6 assumes the internal resistance R of the battery pack (step 32). For example, the BMS 6 stores in advance a table indicating a relationship between the pack temperature T and the internal resistance R and assumes the internal resistance R on the basis of the pack temperature T and the table. Note that when there is no problem even if the internal resistance is regarded as not being dependent on the pack temperature T, the BMS 6 may use a predetermined value as the internal resistance R.

Subsequently, the BMS 6 acquires the highest cell voltage as the maximum cell voltage Vmax (step S3).

Then, on the basis of the pack temperature T, the maximum cell voltage Vmax, and the deposition prevention MAP, the BMS 6 calculates the allowable circulating power Pin (step S4). For example, in the example in FIG. 3, in the graph where the temperature is equal to the pack temperature T, the BMS 6 obtains the current corresponding to the maximum cell voltage Vmax as an allowable current Iin, and obtains the allowable circulating power Pin (=Vp×Iin) that is a power corresponding to the allowable current Iin, which can be input to all of the packs, through a predetermined calculation. In this case, the allowable circulating power Pin changes in accordance with the maximum cell voltage Vmax, and as a result, the allowance condition also changes in accordance with the maximum cell voltage Vmax.

When the allowable circulating power Pin is calculated, the BMS 6 outputs to the master control unit 7 the pack voltage Vp, the internal resistance R, and the allowable circulating power Pin as the battery information (step S5).

The master control unit 7 receives the battery information from the BMS 6 of each of the battery packs 101 and 102. On the basis of the pack voltages Vp1 and Vp2 included in the battery information, the master control unit 7 calculates the pack voltage difference $\Delta V$ (=|Vp1−Vp2|) (step S6).

Subsequently, on the basis of the pack voltage difference $\Delta V$ and the internal resistances R1 and R2 included in the battery information, the master control unit 7 calculates the assumed circulating current Ic (=$\Delta V$/(R1+R2)) (step S7). Then, the master control unit 7 determines whether the assumed circulating current Ic is less than the threshold current Ith (step S8).

If the assumed circulating current Ic is greater than or equal to the threshold current Ith, the master control unit 7 determines that a mutual connection between the battery packs 101 and 102 is not allowed, and the process ends. On the other hand, if the assumed circulating current Ic is less than the threshold current Ith, the master control unit 7 selects a battery pack (the battery pack 102 in this example) having the lower pack voltage Vp of the battery packs 101 and 102, as the charging battery pack. Then, on the basis of the assumed circulating current Ic and the internal resistance R2 of the charging battery pack 102, the master control unit 7 calculates the assumed circulating power Pc (=$Ic^2 \times R2$) that is the assumed circulating power supplied to the charging battery pack 102 by the circulating current (step S9).

Subsequently, the master control unit 7 determines whether the assumed circulating power Pc is less than the allowable circulating power Pin2 included in the battery information (step S10). If the assumed circulating power Pc is greater than or equal to the allowable circulating power Pin2, the master control unit 7 determines that a mutual connection between the battery packs 101 and 102 is not allowed, and the process ends. On the other hand, if the assumed circulating power Pc is less than the allowable circulating power Pin2, the master control unit 7 allows a mutual connection between the battery packs 101 and 102 and outputs a connection instruction to the BMS 6 of each of the battery packs 101 and 102 (step S11).

Upon reception of the connection instruction from the master control unit 7, the BMS 6 turns on the switch 5 to connect the battery unit 1 to the battery unit of the other battery pack, thereby connecting the battery packs in parallel to each other (step S12), and the process ends.

Note that in addition to the above operation, on the basis of another condition as necessary, it may be determined whether a mutual connection between the battery packs 101 and 102 is allowed. In this case, in a case where the assumed circulating current Ic is less than the threshold current Ith, where the assumed circulating power Pc is less than the allowable circulating power Pin, and where another condition is satisfied, a mutual connection between the battery packs 101 and 102 is allowed. In a case where there are three or more battery packs, the master control unit 7 executes the above process for each of the battery packs and connects any battery pack for which the connection is allowed to the battery pack 101, which is the master battery pack.

As described above, according to this embodiment, since the allowance condition for determining whether the battery packs 101 and 102 are to be connected in parallel to each other changes in accordance with the voltage of the battery pack 102, which is the charging battery pack, it is possible to determine whether the battery packs 101 and 102 are to be connected in parallel to each other in consideration of deposition. Thus, it becomes possible to suppress battery performance degradation due to deposition.

For a further detailed description, this embodiment suppresses battery performance degradation due to Li deposition, which can occur by the circulating current when the relay 5 of each of the battery packs 101 and 102 is turned on from a state where all of the relays 5 are turned off, and also suppresses a relay defect due to a large circulating current. Thus, the master control unit 7 determines the charging battery pack on the basis of the total voltage Vp, which is the battery information of the battery unit from each of the battery packs, and calculates the assumed circulating power Pc (battery characteristic) regarding the charging battery pack on the basis of the resistance R, the voltage difference $\Delta V$, and the total voltage Vp, which are the battery information.

In addition, on the basis of the total voltage Vp and the predetermined relationship between the current I and the voltage V (FIG. 3), the allowable circulating power Pin2 (allowance condition) regarding the charging battery pack is calculated, and it is determined whether a parallel connection is to be made by comparing the allowable circulating power Pin2 and the assumed circulating power Pc with each other. If it is determined that the parallel connection is to be made, the relays 5a of each of the battery packs are turned on. The above relationship between the current and the voltage is such that the current decreases as the voltage information (Vmax) increases.

In this manner, as the maximum cell voltage Vmax of the charging battery pack that affects deposition is higher, the allowable current Iin is lower, and the allowable circulating power Pin2 is lower. Thus, if the assumed circulating power Pc is less than the allowable circulating power Pin2 regarding the charging battery pack, the relay 5 is turned on. However, as Vmax is higher, the allowable circulating power Pin2 is lower, and thus, the relay 5 is not turned on unless the assumed circulating power Pc becomes much lower. As a result, since the assumed circulating power Pc is dependent on the temperature, the relay is not turned on until the temperature increases. Thus, it becomes possible to suppress battery performance degradation due to deposition.

Second Embodiment in this embodiment, although a configuration of a power supply system is the same as the configuration in the first embodiment illustrated in FIGS. 1 and 2, the specific battery characteristic for determining whether a mutual connection between the battery packs 101 and 102 is allowed differs from that in the first embodiment.

Specifically, in this embodiment, the master control unit 7 calculates, as the specific battery characteristic of the charging battery pack 102, a maximum assumed value among the voltages of the battery cells in the charging battery pack when the battery packs 101 and 102 are connected in parallel to each other. In a case where the battery unit 1 is composed of the battery string including the plurality of battery cells 1a as in this embodiment, first, the master control unit 7 calculates an assumed voltage applied to one of the battery cells 1a included in the charging battery pack 102 (this voltage is applied to the battery cell 1a separately from an CC V (Open-circuit voltage: open-circuit voltage) of the battery cell 1a), and adds, to the assumed voltage, a maximum voltage among the voltages (OCVs) of the battery cells 1a in the charging battery pack 102 to calculate the maximum assumed value among the voltages of the battery cells 1a. Hereinafter, the maximum assumed value is referred to as parallel-connection assumed maximum cell voltage Vc.

On the basis of the assumed circulating current Ic, the maximum cell voltage Vmax2 and the internal resistance R2 of the charging battery pack 102, and the number n of the battery cells 1a in the charging battery pack 102, the master control unit 7 calculates the parallel-connection assumed maximum cell voltage Vc (=Vmax2+IcR2/n). In this case, the parallel-connection assumed maximum cell voltage Vc that is the specific battery characteristic changes in accordance with the voltage (the maximum cell voltage Vmax2) of the charging battery pack 102.

In addition, in this embodiment, the allowance condition is that the parallel-connection assumed maximum cell voltage Vc is less than a deposition allowable voltage Vs. The deposition allowable voltage Vs is an allowable value of a voltage applied to one of the cells included in the charging battery pack by a voltage applied to the pack when the battery packs 101 and 102 are connected in parallel to each other. In a case where the battery unit 1 is composed of the battery string including the plurality of battery cells 1a as in this embodiment, the deposition allowable voltage is the allowable value of the voltage applied to one of the battery cells 1a in the charging battery pack 102. Note that the deposition allowable voltage Vs is calculated by the master control unit 7.

Figure 5:
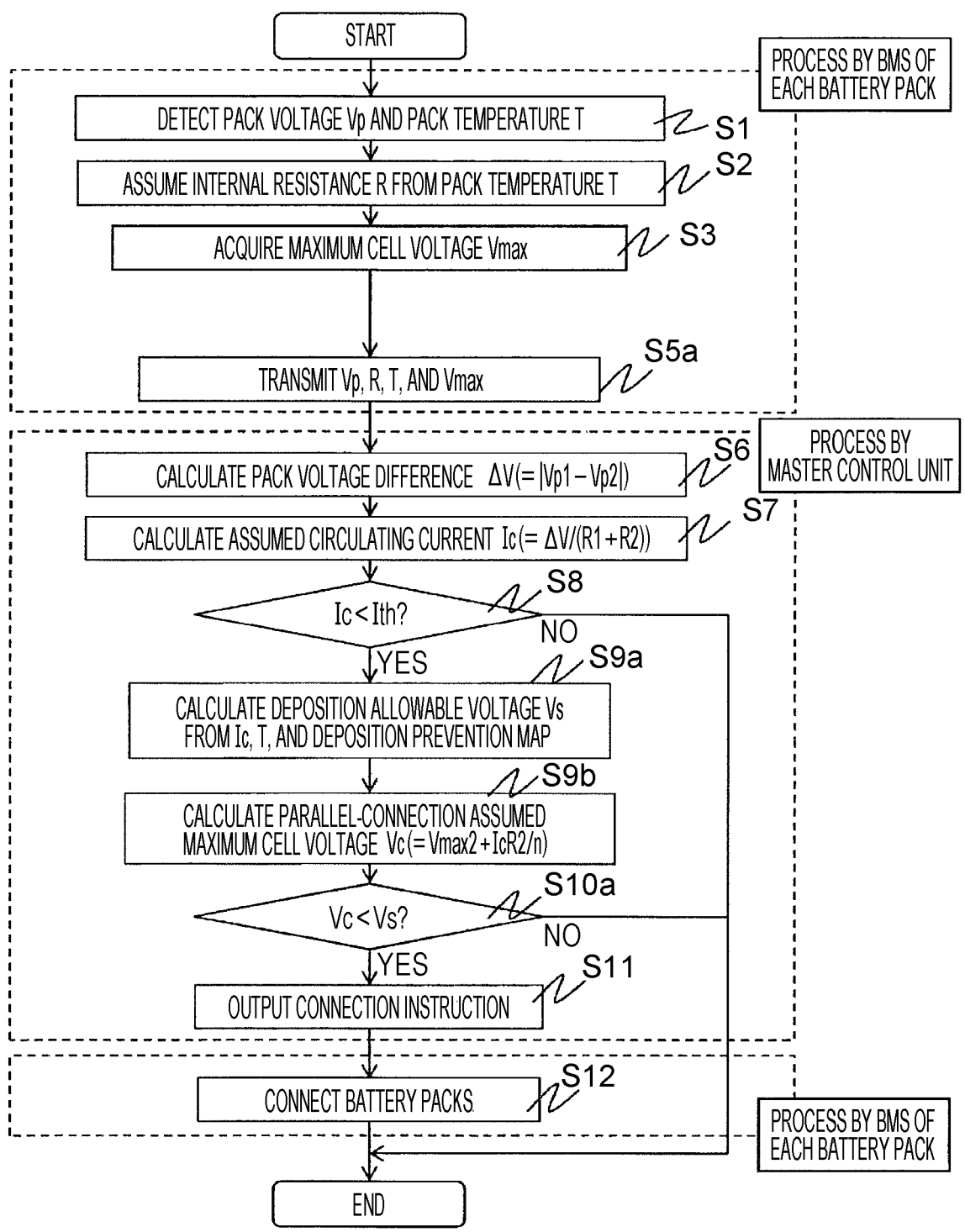
FIG. 5 is a flowchart for illustrating an operation of a power supply system according to a second embodiment of the present invention.

Next, an operation will be described. FIG. 5 is a flowchart for illustrating an operation of the power supply system according to this embodiment. First, steps S1 to S3 described with reference to FIG. 4 are executed. Upon the end of step S3, the BMS 6 of each of the battery packs 101 and 102 outputs to the master control unit 7 the pack voltage Vp, the internal resistance R, the pack temperature T, and the maximum cell voltage Vmax as the battery information (step S5a). Subsequently, the master control unit 7 receives the battery information from each of the battery packs 101 and 102 and executes steps S6 to S8 described with reference to FIG. 3.

In step S8, if the assumed circulating current Ic is greater than the threshold current Ith, the master control unit 7 determines that a mutual connection between the battery packs 101 and 102 is not allowed, and the process ends. On the other hand, if the assumed circulating current Ic is less than the threshold current Ith, the master control unit 7 selects a battery pack (the battery pack 102 in this example) having the lower pack voltage Vp of the battery packs 101 and 102 as the charging battery pack.

Then, on the basis of the assumed circulating current Ic, the pack temperature T, and the deposition prevention MAP (FIG. 3), the master control unit 7 calculates the deposition allowable voltage Vs that is the allowable voltage for each of the battery cells 1a (step S9a). For example, in the example in FIG. 3, the master control unit 7 calculates the voltage corresponding to the assumed circulating current Ic as the deposition allowable voltage Vs in the graph where the temperature is equal to the pack temperature T.

Subsequently, on the basis of the maximum cell voltage Vmax2 and the internal resistance R2 included in the battery information from the charging battery pack 102, the assumed circulating current Ic calculated in step S7, and the number n of the battery cells 1a in the charging battery pack 102, the master control unit 7 calculates the parallel-connection assumed maximum cell voltage Vc (=Vmax2+IcR2/n) (step S9b).

Note that the number n of the battery cells 1a in the charging battery pack 102 may be stored in the master control unit 7 or may be sent to the master control unit 7 as the battery information by the BMS 6 of the charging battery pack 102.

Then, the master control unit 7 determines whether the parallel-connection assumed maximum cell voltage Vc is less than the deposition allowable voltage Vs (step S10a). If the parallel-connection assumed maximum cell voltage Vc is greater than or equal to the deposition allowable voltage Vs, the master control unit 7 determines that a mutual connection between the battery packs 101 and 102 is not allowed, and the process ends. On the other hand, if the parallel-connection assumed maximum cell voltage Vc is less than the deposition allowable voltage Vs, the master control unit 7 executes step S11. Subsequently, step S12 is executed.

In this embodiment, the parallel-connection assumed maximum cell voltage Vc that is the specific battery characteristic changes in accordance with the voltage (the maximum cell voltage Vmax2) of the charging battery pack 102. Thus, it becomes possible to suppress battery performance degradation due to deposition. For a further detailed description, this embodiment suppresses battery performance degradation due to Li deposition, which can occur by the circulating current when the relays 5 of each of the battery packs 101 and 102 are turned on from a state where all of the relays 5 are turned off, and also suppresses a relay defect due to a large circulating current. Thus, the master control unit 7 determines the charging battery pack on the basis of the pack voltage Vp, which is the battery information of the battery unit from each of the battery packs, and calculates the maximum cell voyage Vc (battery characteristic) regarding the charging battery pack on the basis of Vmax, which is the battery information.

In addition, on the basis of the pack voltage Vp, which is the battery information, and the predetermined relationship between the current and the voltage (FIG. 3), the deposition allowable voltage Vs regarding the charging battery pack is calculated, and it is determined whether a parallel connection is to be made by comparing the maximum cell voltage Vc and the deposition allowable voltage Vs with each other. If it is determined that the parallel connection is to be made, the relays 5a of each of the battery backs are turned on. In this manner, as the maximum cell voltage Vmax in the charging battery back that affects lithium deposition is higher, Vc is higher. Thus, if Vc is less than Vs, the relay 5 is turned on. However, as Vmax is higher, Vc is higher, and thus, the relay 5 is unlikely to be turned on. Thus, a current does not flow, and deposition can be suppressed. As a result, by the deposition allowable voltage Vs dependent on the temperature, the relay is not turned on until the temperature increases. Thus, it becomes possible to suppress battery performance degradation due to deposition.

Third Embodiment

Although a determination unit that determines whether a mutual connection between the battery packs 101 and 102 is allowed is included in the master battery pack 101 as the master control unit 7 in the first and second embodiments, the determination unit may be provided outside the battery pack 101.

Figure 6:
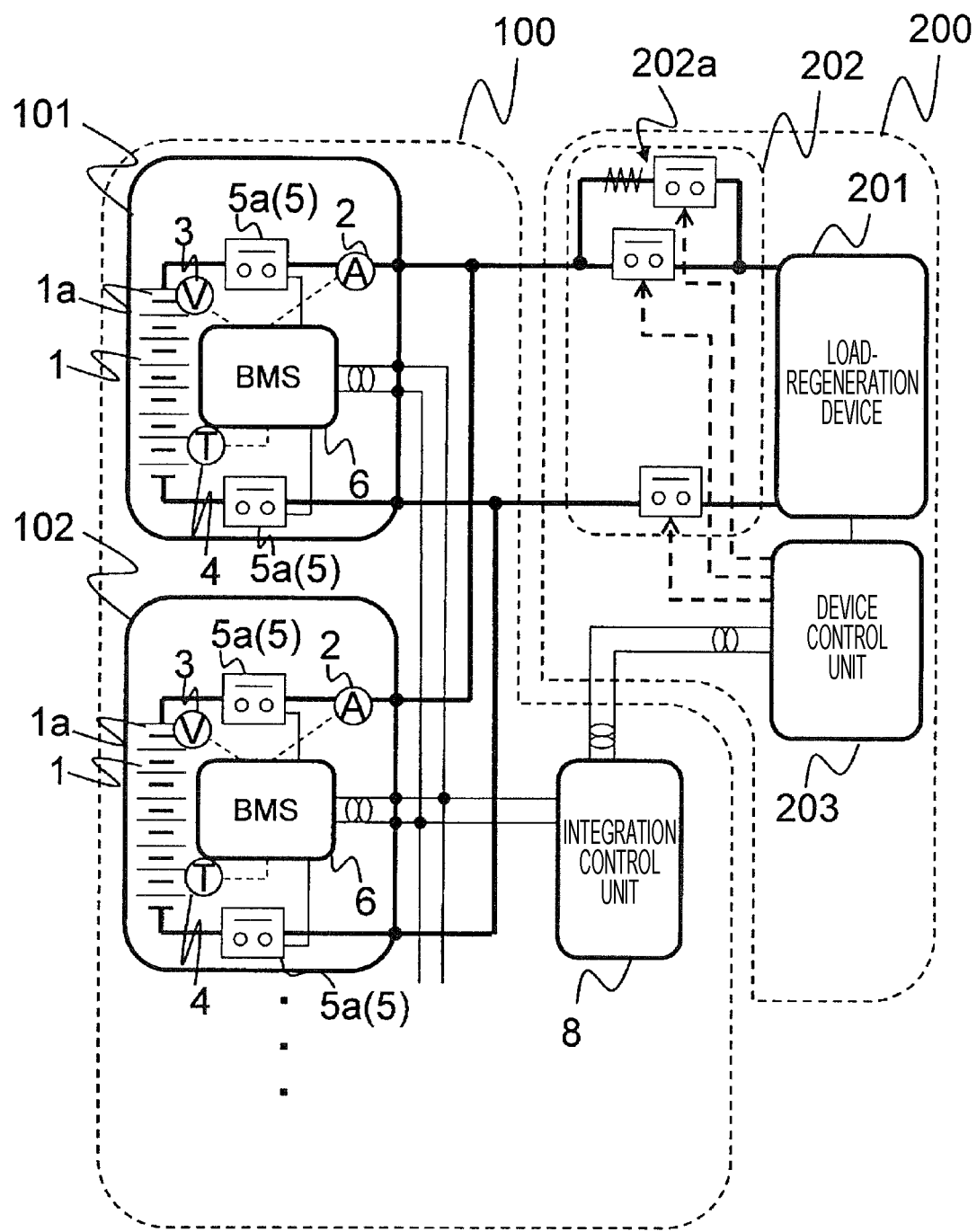
FIG. 6 is a diagram illustrating a configuration of a power supply system according to a third embodiment of the present invention.

FIG. 6 is a diagram illustrating a configuration of a power supply system according to this embodiment. The power supply system in FIG. 6 differs from the power supply system illustrated in FIG. 1 in further including an integration control unit 8. In addition, the battery pack 101 does not include the master control unit 7.

The integration control unit 8 is the determination unit that determines whether a mutual connection between the battery packs 101 and 102 is allowed and has the function of the master control unit 7 illustrated in FIG. 2. In this embodiment, the BMS 6 of each of the battery packs 101 and 102 outputs the battery information to the integration control unit 8 instead of the master control unit 7. An operation of the integration control unit 8 is substantially the same as the operation of the master control unit 7 described in the first and second embodiments, and therefore a detailed description will be omitted.

In the embodiments described above, the illustrated configurations are merely examples, and the present invention is not limited to these configurations. For example, the connection circuit 202 may be omitted (direct coupling may be made). If the relay 5 is in an off-state, the load-regeneration device 201 is also in a waiting state. Thus, even if the connection circuit 202 is omitted (direct coupling is made), when the relay 5 is turned on from the off-state, as long as there is a voltage difference between the battery packs, the circulating current can be generated. Note that if unit batteries each composed of a plurality of battery cells that are connected in parallel are connected in series, the voltage of the charging battery pack is preferably the voltage of one of the unit batteries and a maximum voltage in the charging battery pack.

REFERENCE SIGNS LIST

1 battery unit
1*a* battery cell
2 ammeter
3 voltmeter
4 thermometer
5 switch
5*a* relay
6 BMS
7 master control unit
8 integration control unit
100 power supply system
101, 102 battery pack
200 electric device
201 load-regeneration device
202 connection circuit
203 device control unit

The invention claimed is:

1. A power supply system including a plurality of battery packs, comprising:
calculation means for calculating a specific battery characteristic regarding a charging battery pack that is a battery pack having a lowest voltage among at least two battery packs out of the battery packs for which it is determined whether a parallel connection is to be made; and
determination means for determining whether the at least two battery packs are to be connected in parallel by comparing the battery characteristic and an allowable value with each other,
wherein one of the battery characteristic and the allowable value changes in accordance with a voltage of the charging battery pack.

2. The power supply system according to claim 1, wherein a value of the battery characteristic is increased or the allowable value is decreased as the voltage of the charging battery pack is higher.

3. The power supply system according to claim 1,
wherein each of the battery packs includes a chargeable and dischargeable battery string, a relay that is provided in series to the battery string and connects the battery packs in parallel, and detection means for detecting a state of the battery string,
wherein the battery string is obtained by connecting a plurality of unit batteries in series, and
wherein each of the unit batteries is composed of a single battery cell or a plurality of battery cells connected in parallel.

4. The power supply system according to claim 1, wherein the voltage of the charging battery pack is a voltage of one of the unit batteries and is a maximum voltage in the pack.

* * * * *